US008048468B2

(12) United States Patent
Yoon et al.

(10) Patent No.: US 8,048,468 B2
(45) Date of Patent: Nov. 1, 2011

(54) GLYCERIDE OIL COMPOSITION FROM FISH OIL AND PREPARATION METHOD THEREOF

(75) Inventors: Dong-Hun Yoon, Seoul (KR); Kwang-Hoon Yoon, Seoul (KR); Gi-Wang Han, Seoul (KR); Moon-Won Lee, Chungcheongbuk-do (KR); Young-Ho Lee, Cheongju-si (KR); Sang-Hyuk Park, Chungcheongbuk-do (KR)

(73) Assignee: Ilshin Wells Co., Ltd., Chungcheongbuk-Do (KR)

( * ) Notice: Subject to any disclaimer, the term of this patent is extended or adjusted under 35 U.S.C. 154(b) by 440 days.

(21) Appl. No.: 12/440,584

(22) PCT Filed: Sep. 5, 2007

(86) PCT No.: PCT/KR2007/004272
§ 371 (c)(1),
(2), (4) Date: Mar. 9, 2009

(87) PCT Pub. No.: WO2008/032949
PCT Pub. Date: Mar. 20, 2008

(65) Prior Publication Data
US 2010/0062107 A1 Mar. 11, 2010

(30) Foreign Application Priority Data

Sep. 14, 2006 (KR) .................. 10-2006-0089078

(51) Int. Cl.
*A23D 9/02* (2006.01)
*C07C 67/02* (2006.01)
(52) U.S. Cl. ............ 426/608; 426/33; 426/61; 426/492; 426/601; 554/30; 554/169; 554/174; 435/134; 435/174
(58) Field of Classification Search .............. 426/608, 426/601, 33, 61, 492; 435/134, 174–182; 554/169, 30, 174
See application file for complete search history.

(56) References Cited

U.S. PATENT DOCUMENTS

| 4,985,358 | A | * | 1/1991 | Sawamura et al. | 435/134 |
|---|---|---|---|---|---|
| 6,020,020 | A | * | 2/2000 | Cain et al. | 426/601 |
| 6,159,523 | A | * | 12/2000 | Cain et al. | 426/601 |
| 6,248,909 | B1 | * | 6/2001 | Akimoto et al. | 554/1 |
| 6,410,078 | B1 | * | 6/2002 | Cain et al. | 426/606 |
| 6,461,622 | B2 | | 10/2002 | Liu et al. | |
| 7,442,531 | B2 | * | 10/2008 | Negishi et al. | 435/134 |
| 7,452,702 | B2 | * | 11/2008 | Lee | 435/134 |
| 7,514,244 | B2 | * | 4/2009 | Tanaka et al. | 435/134 |
| 2003/0161864 | A1 | * | 8/2003 | Tanaka et al. | 424/439 |
| 2004/0171127 | A1 | * | 9/2004 | Akimoto et al. | 435/134 |

FOREIGN PATENT DOCUMENTS

KR 10-2005-0007718 A 1/2005

* cited by examiner

*Primary Examiner* — Carolyn Paden
(74) *Attorney, Agent, or Firm* — Birch Stewart Kolasch & Birch, LLP

(57) ABSTRACT

Provided are a glyceride oil composition derived from a fish oil and a preparation method thereof. The composition includes docosahexaenoic acid (DHA) and docosapentaenoic acid (DPA) with a content of 45 to 95% by weight and eicosapentaenoic acid (EPA) with a content of 0.001 to 13% by weight among constituent fatty acids, and a saturated fatty acid having 16 to 18 carbon atoms, which is bonded at 1- and 3-positions, with a content of 0.001 to 5% by weight among constituent fatty acids, in which a weight ratio of docosahexaenoic acid (DHA)/docosapentaenoic acid (DPA) is 0.5 to 8 and a weight ratio of docosahexaenoic acid (DHA)/eicosapentaenoic acid (EPA) is 3.5 to 15. The glyceride oil composition derived from fish oil has nutritional and physiological superiority due to containing a great amount of polyunsaturated fatty acids such as DHA and DPA in a form of glyceride, and can minimize disadvantages of EPA such as inhibition of ω-6 fatty acid metabolism by containing a low amount of EPA. The glyceride oil composition is excellent in digestion and absorption of polyunsaturated fatty acids into a human body by containing a low amount of saturated fatty acids at 1- and 3-positions and process characteristics such as an oxidation stability and water-dispersibility.

20 Claims, No Drawings

GLYCERIDE OIL COMPOSITION FROM FISH OIL AND PREPARATION METHOD THEREOF

TECHNICAL FIELD

The present invention relates to a glyceride oil composition derived from fish oil and a method for preparing the same, and more particularly to a glyceride oil composition derived from fish oil which has nutritional and physiological superiority due to containing a great amount of polyunsaturated fatty acids such as DHA and DPA in a form of glyceride, and can minimize disadvantages of EPA such as ω-6 fatty acid metabolism inhibition by containing a low amount of EPA. The glyceride oil composition is excellent in digestion and absorption of polyunsaturated fatty acids into a human body by containing a low amount of saturated fatty acids at 1- and 3-positions, and process characteristics such as an oxidation stability and water-dispersibility. The present invention further relates to a method for preparing the glyceride composition.

BACKGROUND ART

Polyunsaturated fatty acids (PUFAs) are not synthesized in a human body, thus it is necessary to consume them as a food instead. It has been known for a prolonged time that PUFAs, as a component for cell serum membrane, are an important biological component that is inevitably required in a brain, especially, of an infant.

In 1970's, Eskimos in Greenland were observed, and as a result, it was found that there is a relationship between a low rate of heart disease and a great amount of consumption of long-chain ω-3 PUFAs [see Dyerberg, L. et al., *Amer. J. Clin Nutr.* 28:958-966 (1975); and Dyberg, J. et al., *Lancet* 2 (8081): 117-119 (Jul. 15, 1978)]. More recent researches confirmed the effects of heart-related protection [see Shinkkawa, H. *World Rev Nutr Diet,* 88: 100-108 (2001); and von schacky, C., and Dyerberg, J., *World Rev Nutr Diet,* 88: 90-99 (2001)]. Moreover, it was found that several diseases react to the treatment using ω-3 fatty acids, for example, restenosis to some extent after angioplasty, flammatory or rheumatoid arthritis, asthma, psoriasis, and eczema. It was found that γ-linolenic acid (GLA; ω-6 PUFA) reduces blood pressure elevation related to stress and improves its performances on the arithmetic test. It was found that GLA and dihomo-γlinolenic acid (DGLA, another ω-6 PUFA) inhibits platelet aggregation, induces vasodilation, reduces the level of cholesterol, and inhibits proliferation of blood vessel wall smooth muscles and fibrous tissues [see Brenner et al., *Adv. Exp. Med. Biol.* 83:85-101 (1976)]. It was found that administration of GLA or DGLA alone or in combination with eicosapentaenoic acid (EPA, ω-3 PUFA) reduces or prevents gastrointestinal bleeding, and reduces and prevents other side effects caused by non-steroidal anti-inflammatory drugs (U.S. Pat. No. 4,666,701). In addition, it has been found that GLA and DGLA prevents and treats endometriosis and premenstrual syndrome (U.S. Pat. No. 4,758,592) and treats myalgic encephalomyelitis and chronic fatigue after viral infection (U.S. Pat. No. 5,116,871). Other evidences indicate that PUFAs can participate in control of calcium metabolism. This suggests that PUFAs are useful for treating and preventing osteoporosis and renal or urinary calculus. Finally, PUFAs can be used in the treatment of cancers and diabetes [see U.S. Pat. No. 4,826,877 and Horrobin et al., *Am. J. Clin, Nutr.* 57 (Suppl.): 732S-737S (1993)].

In general, PUFAs are classified into ω-6 and ω-3 fatty acids derived by unsaturation and elongation of essential fatty acids such as linoleic acid (LA) and α-linolenic acid (ALA), respectively. Here, ω refers to a number of carbons counted from the end of a methyl group to a point of a first double bond in the fatty acid.

It is confirmed that various fatty acids such as ω-6 fatty acids including linoleic acid, dihomo-γ-linolenic acid and arachidonic acid, and ω-3 fatty acids including α-linolenic acid, eicosapentaenoic acid, docosahexaenoic acid and docosapentaenoic acid exhibit each different physiological effects.

Such ω-6 and ω-3 fatty acids are inevitable for maintaining a good health, and they must be consumed in a ratio of about 4:1. However, a westernized diet nowadays has lead to a serious disparity of consuming ω-6 fatty acids on average 20 times more than ω-3 fatty acids. Therefore, in order to recover such a disparity, it is necessary to ingest ω-3 fatty acids.

Docosahexaenoic acid (hereinafter, referred to as 'DHA') is a ω-3 fatty acid having 22 carbon atoms and 6 double bonds. The efficacies of DHA have been known to have contribution to mainly reinforcing brain functions and visual developments. Such DHA is commonly used as a nutritional supplement, and a highly purified product of DHA can be used as a medicine for hyperlipemia.

Docosapentaenoic acid (hereinafter, referred to as 'DPA) is a ω-3 fatty acid having 22 carbon atoms and 5 double bonds. DPA has been known to have effects on thrombosis inhibition, carbohydrate metabolism, and improvement in vascular endothelial cell plasticity.

Eicosapentaenoic acid (hereinafter, referred to as 'EPA') is a ω-3 fatty acid having 20 carbon atoms and 5 double bonds. EPA exerts various physiological activities such as inhibiting platelet aggregation in a human body, reducing a level of triglyceride in a blood plasma, reducing a level of very low density lipoproteins (VLDLs) and low density lipoproteins (LDLs), increasing a level of high density lipoproteins (HDLs), reducing a blood viscosity and blood pressure, and serving antiphlogistic and antineoplastic functions.

For examples relating to oil which uses such polyunsaturated fatty acids, Japanese Patent No. 2572692 discloses DHA triglyceride and its production, Japanese Patent No. 2602743 discloses EPA triglyceride and its production, and Japanese Patent Laid-Open Publication No. 2003-160794 discloses ω-3 type unsaturated fatty acid in triglyceride. Further, U.S. Pat. No. 6,852,758 discloses ω-3 type unsaturated fatty acid in diglyceride, U.S. Pat. No. 6,410,078 discloses triglycerides rich in polyunsaturated fatty acids, and U.S. Pat. No. 6,200,624 discloses triglycerides containing ω-6 fatty ester moieties that include ARA and DHA. Furthermore, EP patent No. 1544281 discloses DHA in monoglyceride, and WO 00/18944 discloses triglycerols of enriched CLA content.

Additionally, WO 2005/5144 suggests using an oil containing DPA for improving a state of lacking arachidonic acid and increasing arachidonic acid. However, the DPA content is extremely low, and the oil is derived from microorganisms with a high production cost. WO 2003/24237 discloses an oil composition comprising ω-3 fatty acids capable of preventing accumulation of body fat. However, the content of the ω-3 fatty acid among the constituent fatty acids of diglyceride is less than 15% by weight, which is low.

Many of these patents use ω-3 fatty acids, but the approaches were made on a wide range of fatty acids having 18 or more carbon atoms. Examples containing a great amount of polyunsaturated fatty acids were not to be found. Especially, the patents relate to mostly triglycerides containing polyunsaturated fatty acids, and most of the patents relating to diglycerides containing polyunsaturated fatty acids also had no application of DPA functionalities. Moreover, there have been no examples of limiting the content of EPA.

Meanwhile, important ω-3 fatty acids of docosahexaenoic acid (DHA), eicosapentaenoic acid (EPA), and docosapentaenoic acid (DPA) are found from each different type of fish or ocean plankton. They are also producible from microorganisms [e.g., porphyridium and mortierella]. However, there are disadvantages in that the cost is high, and the cultivation on a commercial scale is difficult.

For example, Japanese Patent Laid-Open No. 8-214891 discloses a production of an oil and fat containing highly polyunsaturated fatty acid in high concentration by reacting the oil and fat with a deformed immobilized-enzyme. Japanese Patent Laid-Open No. 6-287593 suggests a method for stabilizing fat or oil by transesterification to inhibit oxidation of polyunsaturated fatty acid contained in fish.

However, the above-mentioned patents contains the polyunsaturated fatty acid in a great amount of 45% by weight or more, thus concentration thereof is difficult and the production unit cost is not effective.

DISCLOSURE OF INVENTION

Technical Problem

Therefore, the present invention has been made in view of the above problems, and it is an object of the present invention to provide a glyceride oil composition derived from a fish oil which has nutritional and physiological superiority due to containing a great amount of polyunsaturated fatty acids such as DHA and DPA in a form of glyceride, and can minimize disadvantages of EPA such as inhibition of ω-6 fatty acid metabolism by containing a low amount of EPA. The glyceride oil composition is excellent in digestion and absorption of polyunsaturated fatty acids into a human body by containing a low amount of saturated fatty acids at 1- and 3-positions, namely, stearic acid and palmitic acid.

It is another object of the present invention to provide a method for preparing a glyceride oil composition derived from a fish oil capable of being concentrated with a high content of polyunsaturated fatty acid, and whose production unit cost is economical.

Technical Solution

In accordance with an aspect of the present invention, the above and other objects can be accomplished by the provision of a glyceride oil composition derived from a fish oil comprising:

docosahexaenoic acid (DHA) and docosapentaenoic acid (DPA) with a content of 45 to 95% by weight and eicosapentaenoic acid (EPA) with a content of 0.001 to 13% by weight among constituent fatty acids, and a saturated fatty acid having 16 to 18 carbon atoms, which is bonded at 1- and 3-positions, with a content of 0.001 to 5% by weight among constituent fatty acids, wherein a weight ratio of docosahexaenoic acid (DHA)/docosapentaenoic acid (DPA) is 0.5 to 8 and a weight ratio of docosahexaenoic acid (DHA)/eicosapentaenoic acid (EPA) is 3.5 to 15.

In accordance with another aspect of the present invention, there is provided a method for preparing a glyceride oil composition derived from a fish oil comprising:

subjecting a purified fish oil to specific hydrolysis at 1- and 3-positions using a 1,3-position specific immobilized enzyme, separating the hydrolyzed products into fatty acids and glycerides, and subjecting the separated fatty acid to molecular distillation to isolate polyunsaturated fatty acid, subjecting the separated glycerides to cooling crystallization to separate a liquid oil, mixing the isolated polyunsaturated fatty acid and the separated liquid oil with a weight ratio of 5.0 to 80.0:20.0 to 95.0, and subjecting the mixture to transesterification using a 1,3-position specific immobilized enzyme at a temperature of 25 to 80° C. and a stirring of 10 to 400 rpm, and under a reduced pressure of 0.001 to 10 Torr for 1 to 48 hours, and removing the unreacted residual substances by carrying out a distillation and typical purification process.

In accordance with yet another aspect of the present invention, there is provided a method for preparing a glyceride oil composition derived from a fish oil comprising:

subjecting a purified fish oil to non-specific hydrolysis using a non-specific immobilized enzyme;

separating the hydrolyzed products into fatty acids and glycerides and subjecting the separated fatty acid to molecular distillation to isolate polyunsaturated fatty acid;

subjecting the fish oil to cooling crystallization to separate a liquid oil;

mixing the isolated polyunsaturated fatty acid and the separated liquid oil with a weight ratio of 30.0 to 80.0:20.0 to 70.0, and subjecting the mixture to transesterification using a 1,3-position specific immobilized enzyme at a temperature of 25 to 80° C. and a stirring of 10 to 400 rpm, and under a normal pressure for 1 to 48 hours; and removing the unreacted residual substances by carrying out a distillation and typical purification process.

Advantageous Effects

The glyceride oil composition derived from fish oil of the present invention has nutritional and physiological superiority due to containing a great amount of polyunsaturated fatty acids such as DHA and DPA in a form of glyceride, and can minimize disadvantages of EPA such as inhibition of ω-6 fatty acid metabolism by containing a low amount of EPA. The glyceride oil composition is excellent in digestion and absorption of polyunsaturated fatty acids into a human body by containing a low amount of saturated fatty acids at 1- and 3-positions and process characteristics such as an oxidation stability and water-dispersibility.

BEST MODE FOR CARRYING OUT THE INVENTION

The present invention will now be described in greater detail.

As a result of a variety of extensive and intensive studies and experiments on a glyceride oil composition derived from a fish oil containing a great amount of polyunsaturated fatty acids and having excellent digestion and absorption characteristics into a human body, the inventors of the present invention have confirmed that upon containing a low amount of saturated fatty acids having 16 to 18 carbon atoms bonded at 1- and 3-positions, the digestion and absorption of the polyunsaturated fatty acids are increased, and the problems such as the taste impairment and high melting point temperature can be solved. The present invention has been completed based on these findings.

The glyceride oil composition derived from a fish oil of the present invention comprises polyunsaturated fatty acids such as docosahexaenoic acid (DHA) and docosapentaenoic acid (DPA) with a content of 45 to 95% by weight and eicosapentaenoic acid (EPA) with a content of 0.001 to 13% by weight as constituent fatty acids, wherein a weight ratio of docosahexaenoic acid (DHA)/docosapentaenoic acid (DPA) is 0.5 to 8 and a weight ratio of docosahexaenoic acid (DHA)/eicosapentaenoic acid (EPA) is 3.5 to 15.

The glyceride oil composition derived from a fish oil of the present invention contains DHA and DPA in a large amount as constituent fatty acids. Therefore, it is possible to give functionality of DHA having various physiological effects such as cognitive ability improvement, visual development, anti-cancer effect and reinforcement learning effect and DPA having effects of thrombosis inhibition, carbohydrate metabolism and prevention of vascular-related diseases.

Moreover, the content of EPA is less than 13% by weight, which is low. The EPA requires a caution, because it has effects of inhibiting platelet aggregation and extending the bleeding time. EPA has various physiological effects such as reducing a level of triglyceride in a blood plasma, reducing a level of very low density lipoproteins (VLDLs) and low density lipoproteins (LDLs), increasing a level of high density lipoproteins (HDLs), reducing a blood viscosity and blood pressure, and serving antiphlogistic and antineoplastic functions. However, EPA inhibits ω-6 fatty acid metabolism during the synthesis of eicosanoid, and in the case of infants, it reduces arachidonic acid in the human body, thereby resulting in the slowdown of growth. The glyceride oil composition derived from fish oil of the present invention can minimize the above disadvantages accompanied with consumption of EPA by containing EPA in an amount of 0.001 to 13% by weight and reducing the content of EPA such that a weight ratio of DHA/EPA is 3.5 to 15.

In addition, the content of eicosapentaenoic acid (EPA) among ω-3 fatty acids existing in a fish oil is reduced such that a weight ratio of DHA/DPA is 0.5 to 8 and a weight ratio of DHA/EPA is 3.5 to 15 and the content of DHA and DPA is increased.

The glyceride oil composition derived from fish oil of the present invention may contain a saturated fatty acid having 16 to 18 carbon atoms bonded at 1- and 3-positions in an amount of 0.001 to 5% by weight.

That is, the present invention can ensure the oxidation stability due to a low content of saturated fatty acid, have advantages on health care, as well as solve the problems such as the taste impairment and high melting point temperature caused by the saturated fatty acids, thereby improving the processing characteristics.

At this time, it is preferable that the saturated fatty acid is palmitic acid (C16:0) or stearic acid (C18:0) in the viewpoint of the oxidation stability and the digestion and absorption of the polyunsaturated fatty acid.

The palmitic acid and stearic acid at 1- and 3-positions are decomposed by an enzyme at the small intestine, and then formed a soap. As a result, absorption of the fatty acids to be used as a source for energy is reduced. Additionally, absorption of the polyunsaturated fatty acids is also reduced by forming insoluble salts. Therefore, it is preferable that the content of palmitic acid and stearic acid at 1- and 3-positions is 0.001 to 5% by weight.

Here, it is preferable that the glycerides include 20 to 98% by weight of triglyceride and 2 to 80% by weight of diglyceride in the point of digestion and absorption characteristics, oil stability, and physiological effect. Most preferably, the glyceride oil composition derived from a fish oil of the present invention may include (i) 20 to 98% by weight of triglyceride containing docosahexaenoic acid (DHA) and docosapentaenoic acid (DPA) with a content of 45 to 95% by weight and eicosapentaenoic acid (EPA) with a content of 0.001 to 13% by weight among constituent fatty acids, and stearic acid and palmitic acid bonded at 1- and 3-positions with a content of 0.001 to 5% by weight among the constituent fatty acids, wherein a weight ratio of docosahexaenoic acid (DHA)/docosapentaenoic acid (DPA) is 0.5 to 8 and a weight ratio of docosahexaenoic acid (DHA)/eicosapentaenoic acid (EPA) is 3.5 to 15; and (□) 2 to 80% by weight of diglyceride containing docosahexaenoic acid (DHA) and docosapentaenoic acid (DPA) with a content of 55 to 95% by weight and eicosapentaenoic acid (EPA) with a content of 0.001 to 10% by weight among constituent fatty acids, and stearic acid and palmitic acid bonded at 1- and 3-positions with a content of 0.001 to 3% by weight among the constituent fatty acids, wherein a weight ratio of docosahexaenoic acid (DHA)/docosapentaenoic acid (DPA) is 0.5 to 8, a weight ratio of docosahexaenoic acid (DHA)/eicosapentaenoic acid (EPA) is 3.5 to 15, and a weight ratio of 1,3-diglyceride/1,2-diglyceride is 0.4 to 4.5.

The glyceride oil composition derived from a fish oil of the present invention includes diglyceride having a good water-dispersibility than triglyceride. The diglyceride has an advantage in that it easily dissolves in an antioxidant, such as butylhydrozyanisole (BHA), butylated hydroxyl toluene (BHT), tert-butylhydroquinone (TBHQ), a natural antioxidant, catechin, Vitamin C or derivatives thereof, or Vitamin E, used for increasing the oxidation stability.

It is preferable that the glyceride oil composition derived from a fish oil of the present invention further includes an antioxidant. At this time, the antioxidant is preferably contained in an amount of 0.001 to 5% by weight in the point of the oxidation stability. As the antioxidant, in general, use can be made of any one capable of being added to a food. Preferably, butylhydrozyanisole (BHA), butylated hydroxyl toluene (BHT), tert-butylhydroquinone (TBHQ), a natural antioxidant, catechin, Vitamin C or derivatives thereof, or Vitamin E is used.

As mentioned above, the glyceride oil composition derived from a fish oil of the present invention contains the polyunsaturated fatty acids such as DHA and DPA, which are essential nutritional components and have various physiological activities, in a large amount. Thus, the glyceride oil composition has nutritional and physiological superiorities and can minimize side effects accompanied with the consumption of EPA due to a small content of EPA. Additionally, the oxidation stability and the digestion and absorption characteristics into a human body are improved due to a small content of saturated fatty acids bonded at 1- and 3-positions. Furthermore, the water-dispersibility is excellent by containing an appropriate ratio of diglyceride.

Therefore, the glyceride oil composition derived from a fish oil of the present invention may be used as a cooking oil, a salad oil, an oil for frying, margarine, fat spread, shortening, ice cream, a fresh cream substitute, dressing, mayonnaise, an edible oil for baking, or an infant food.

The glyceride oil composition derived from a fish oil of the present invention may be prepared in the following two methods.

First, a purified fish oil is subjected to specific hydrolysis at 1- and 3-positions, and the hydrolyzed product is separated into glycerides and fatty acids. Then, the separated fatty acids are again subjected to molecular distillation to isolate polyunsaturated fatty acids. Meanwhile, the separated glycerides are subjected to cooling-crystallization to separate a liquid oil containing unsaturated fatty acids. Thereafter, the isolated polyunsaturated fatty acids and the separated liquid oil are subjected to transesterification by using a 1,3-position specific immobilized enzyme.

At this time, the isolated polyunsaturated fatty acids and the separated liquid oil are mixed with a weight ratio of 5.0 to 80.0:20.0 to 95.0. When the mixing ratio exceeds the above-mentioned ratio, there is a problem in that a weight ratio of the residual fatty acids or monoglycerides increases, thereby deteriorating the yield in the subsequent purification process and extremely decreasing the rate of the transesterification.

The transesterification is carried out using a 1,3-position specific immobilized enzyme under a reduced pressure of 0.001 to 10 Torr, and at a temperature of 25 to 80° C. and stirring of 10 to 400 rpm for 1 to 48 hours. At this time, under the reduced pressure condition of less than 0.001 Torr, the transesterification rate is not increased, as well as excessive vacuum facilities must be equipped to provide a greater degree of vacuum than required, thus the cost is uneconomical. When the reduced pressure exceeds 10 Torr, water produced during the synthesis is not removed smoothly, thereby deteriorating the ongoing synthesis rate. At the temperature less than 25° C., an effective reaction is not formed, and when the temperature exceeds 80° C., an inactivation of enzyme is generated, thereby remarkably deteriorating the reaction rate. Moreover, at a stirring condition of less than 10 rpm, mixing is not carried out smoothly, and at a condition exceeding 400 rpm, emulsification phenomenon is generated due to a strong stirring. Such emulsification phenomenon is generated remarkably as the reaction volume increases. When the transesterification time is less than 1 hour, the preparation process is completed with the reaction being insufficient. When the time exceeds 48 hours, the reaction is not further carried out.

Secondly, a purified fish oil is subjected to non-specific hydrolysis, and the hydrolyzed product is separated into glycerides and fatty acids. Then, the separated fatty acids are again subjected to molecular distillation to isolate polyunsaturated fatty acids. Meanwhile, the purified fish oil is subjected to cooling-crystallization to separate a liquid oil containing unsaturated fatty acids. Thereafter, the isolated polyunsaturated fatty acids and the separated liquid oil are subjected to transesterification by using a 1,3-position specific immobilized enzyme.

At this time, the isolated polyunsaturated fatty acids and the separated liquid oil are mixed with a weight ratio of 30.0 to 80.0:20.0 to 70.0. When the mixing ratio exceeds the above-mentioned ratio, there is a problem in that a weight ratio of the residual fatty acids or monoglycerides increases, thereby deteriorating the yield in the following purification process and extremely decreasing the rate of the transesterification.

The transesterification is carried out using a 1,3-position specific immobilized enzyme at a temperature of 25 to 80° C. and stirring of 10 to 400 rpm, and under a normal pressure for 1 to 48 hours. When the transesterification temperature is less than 25° C., there is a problem in that the temperature is approximate to a melting point temperature of the saturated fatty acids, thus the reaction solution becomes turbid. When the temperature exceeds 80° C., the enzymatic activity is restricted, thereby deteriorating the synthetic yield. Thus, the production unit cost is increased and the emulsification phenomenon is generated by the stirring condition. When the stirring condition is less than 10 rpm, mixing is not carried out smoothly, and at a condition exceeding 400 rpm, the physical strength applied to the immobilized enzyme is increased due to the strong stirring, thereby deeply accelerating the enzymatic inactivity. In addition, when the reaction time is less than 1 hour, the preparation process is completed with the reaction being insufficient. When the time exceeds 48 hours, the reaction is not further carried out.

As the lipase that can be used in the enzymatic reaction in the method of the present invention, a conventionally known a 1,3-position specific immobilized enzymes such as enzyme derived from microorganisms including *Rhizopus* sp., *Aspergillus* sp. or *Mucor* sp., or non-specific enzyme including *Candida cylindracea* or the pancreas lipase are preferable, but it is not limited to any one type of enzyme. In the embodiment of the present invention, a 1,3-position specific immobilized enzyme (Lipozyme RM IM) was used by purchasing from Novo Nordisk A/S.

The enzyme may be used in an amount of 0.1 to 20 parts by weight based on the 100 parts by weight of the reactive substances in the enzymatic reaction. At this time, when the use amount of the enzyme is less than 0.1 parts by weight, the transreaction rate deteriorated remarkably. When the amount exceeds 20 parts by weight, the reaction is not further carried out, thereby deteriorating the economical efficiency.

Hereinafter, the preparation method of the present invention will be described in greater detail.

Step (1) Specific Hydrolysis Reaction at 1- and 3-Positions

In further describing the reaction conditions, first, a purified fish oil is mixed with water, and an overall or partial hydrolysis reaction is carried out by using a 1,3-position specific immobilized enzyme. In the hydrolysis step, it is preferable that 40 to 150 parts by weight of the purified fish oil is added based on 100 parts by weight of water. Furthermore, a process of isolating 10 to 90% by weight of fatty acid among total fatty acids from glycerides is carried out.

Step (2) Non-Specific Hydrolysis Reaction

This process is a hydrolyzing process that can substitute the step (1). As mentioned in the above step (1), the same amount of a purified fish oil and water are used to carry out the isolation process of partial fatty acids in the oil. That is, 0.1 to 99% by weight of fatty acids among the total fatty acids is isolated from glyceride.

As the hydrolysis condition, it is preferable that the mixture of the mixed oil and water is stirred at 10 to 400 rpm. When the stirring rate is less than 10 rpm, there is a problem in that the stirring power is low such that a phase separation between oil and water is formed and a hydrolysis rate is reduced. When the rate exceeds 400 rpm, there is a problem in that an emulsification phenomenon is generated between the oil and water, thereby having difficulties in separating the water and oil in the subsequent process, which is not preferable.

Step (3) Separation of Fatty Acids and Glycerides

In the hydrolyzed oil obtained from the above step (1) or (2), the completion of the hydrolysis reaction is confirmed, and the stirring is terminated. Then, by providing the fixed conditions, the oil phase separated from water is obtained. The oil thus obtained is a mixture of fatty acids, monoglycerides, and triglycerides. Thus, fatty acids, namely, saturated fatty acids are removed in this step.

As a method for removing the fatty acids, use can be made of distillation, crystallization, low temperature crystallization, urea addition, or chromatography. Particularly, a method for precipitating the saturated fatty acid by selectively subjecting to crystallization using a urea addition method, a method for removing fatty acids by an atmospheric distillation or vacuum distillation method, or a crystallization method using the variation of inherent melting point temperatures of fatty acids by providing a low temperature condition is preferable. Such a separation method can increase the removal rate of the fatty acid by a method alone or with a combination of methods. Especially, the vacuum distillation method is usable in the final separation step. When the vacuum distillation condition is less than 0.001 Torr, there is a problem in that monoglycerides and diglycerides are also distilled together with fatty acids. When the pressure exceeds 10 Torr, fatty acid distillation becomes difficult. Thus control of a degree of vacuum in applying to the vacuum distillation condition is very important.

Step (4) Separation of Liquid Oil

An object of the present step is to separate glycerides containing a great amount of polyunsaturated fatty acids and glycerides containing a great amount of saturated fatty acids using glycerides of a purified fish oil or the above separated glycerides. While stirring the purified fish oil at 50° C. for 1 hour at about 10 to 300 rpm, the particles that can affect crystallization are removed. Then, the temperature of the purified fish oil is decreased to −10° C. at a cooling rate of 5 to 10° C./hr to obtain as solid oil. At this time, it is most preferable that a cooling rate is 5 to 10° C./hr. When the cooling rate is faster than the above range is provided, a part of oil is solidified so that the separation becomes difficult. When the cooling rate is slower, the selectivity of the solid oil is deteriorated thereby reducing the yield. Thus, a longer process time is required and the productivity is deteriorated.

Meanwhile, when the stirring rate exceeds 300 rpm, the stirring affects the crystal formation, thereby reducing the yield. When the rate is less than 10 rpm, the heat transfer is inhibited, and the solid oil formation becomes difficult. In addition, by adding a crystallization promoting agent such as various emulsifying agents to accelerate the crystal formation, a high yield can be achieved.

Step (5) Transesterification

The polyunsaturated fatty acid and the liquid oil are subjected to the transesterification using a 1,3-position specific immobilized enzyme to obtain a glyceride oil composition derived from a fish oil of the present invention.

In the transesterification step, the separated glyceride, an appropriate ratio of fatty acids or isolated polyunsaturated fatty acids, and the liquid oil are mixed. Then, the mixture is subjected to the transesterification using the 1,3-position specific immobilized enzyme at a temperature of 25 to 80° C. and a stirring of 10 to 400 rpm, and under a reduced pressure of 0.001 to 10 Torr for 1 to 48 hours.

In order to ensure the cost effectiveness and efficiency, it is important in selecting a reactor for an immobilized enzyme. As a result, the following reactor can be produced in consideration with a reaction method, a solvent, a substrate, an alignment of the reactor, enzyme, an immobilization method, use or no use and type of an immobilization aid, and supporting substances. That is, it is very important to have operational techniques of a reactor that derives optimal transesterification condition, while minimizing the loss of the immobilized enzyme such as a batch stirred tank reactor (BSTR), a packed-bed reactor (PBR), or a membrane reactor (MR). It is preferable that the transesterification is carried out at a stirring rate of 10 to 300 rpm, and more preferably 150 rpm. It is preferable that the transesterification is carried out at a temperature of 25 to 80° C., and particularly preferably 45° C. As a transfer rate, a proper operational condition must be provided in accordance with the quality of the products. When the stirring rate or transfer rate is too slow, there is a problem in that the transition rate is reduced. When the stirring rate or the transfer rate exceeds an appropriate level, the quality of the product is deteriorated in addition to increase in the degradation of immobilized enzyme. Thus, it is important to control the stirring and transfer rate. In addition, when the reaction temperature is less than 25° C., there is a problem in that the transition rate by using the enzyme is reduced. When the temperature exceeds 80° C., the initial reaction rate is fast, but there is a problem in that the enzyme and the like can be affected by the heat. Furthermore, when the reaction time is less than 1 hour, the transition rate is not good due to reduction of the reaction time.

As seen from the above, the preparation method according to the present invention has relatively simple preparation processes and the productivity is excellent. In addition, the production of highly functional oil is possible due to a low production unit cost.

MODE FOR THE INVENTION

Now, the present invention will be described in more detail with reference to the following Examples.

These examples are provided only for illustrating the present invention and should not be construed as limiting the scope and spirit of the present invention.

Example 1

Step (1) Non-Specific Hydrolysis Reaction

In a 3-liter reactor equipped with a stirrer, a purified fish oil (1000 g), purified water (1000 g) and 4 g of a non-specific enzyme (Lipase-OF, manufactured by Meito Sangyo Co., Ltd.) were mixed. Then, while stirring at a stirring rate of 300 rpm, the mixture was non-selectively subjected to hydrolysis at 40° C. for 10 hours to prepare a hydrolyzed oil composition.

Step (2) Separation of Fatty Acids

In order to separate glycerides such as monoglyceride, diglyceride and triglyceride and fatty acids in the above prepared hydrolyzed oil, the obtained hydrolyzed oil was subjected to a vacuum distillation under a vacuum condition of 1 Torr to obtain fatty acids (820 g). The obtained free fatty acids were again subjected to a molecular distillation at 220° C. to isolate polyunsaturated fatty acids (340 g) having 22 or more carbon atoms.

Step (3) Separation of Liquid Oil

In a separate process, the purified fish oil (1000 g) was sufficiently melted at 50° C. Then, while slowly stirring at 15 rpm, the melted purified fish oil was subjected to a cooling crystallization, which cools the fish oil to −5° C., to remove solid oil (650 g). Thereby, liquid oil (150 g) containing a greater amount of polyunsaturated fatty acids was obtained.

Step (4) Transesterification and Purification

The isolated polyunsaturated fatty acid (330 g) in the step (2) and the separated liquid oil (110 g) in the step (3) were mixed, and 6.6 g of Novozyme 435 was added thereto. Then, the transesterification was carried out on the mixture under a reduced pressure of 5 Torr, and at a stirring of 250 rpm and temperature of 40° C. for 20 hours. Next, the enzyme was removed by filtration to obtain about 430 g of processed oil. Subsequently, the processed oil was subjected to a molecular distillation to remove the residual free fatty acids, then, discoloration and deodorization were performed thereon to obtain an oil composition according to the present invention.

Analysis of fatty acids and glycerides in the oil composition was carried out by a method disclosed in Analytic Examples. The results are presented in Tables 1 to 4.

Example 2

Step (1) Specific Hydrolysis Reaction at 1- and 3-Positions

In a 3-liter reactor equipped with a stirrer, a purified fish oil (1000 g), purified water (1000 g) and 8 g of a 1,3-position specific immobilized enzyme (Novozyme CALB L, manufactured by Novo Nordisk A/S) were mixed. Then, the mixture was reacted while stirring at a stirring rate of 150 rpm, and at 45° C. for 10 hours to prepare a specific hydrolyzed oil composition at 1- and 3-positions.

Step (2) Separation of Glycerides and Fatty Acids

In order to separate glycerides such as monoglyceride, diglyceride and triglyceride and fatty acids in the above prepared hydrolyzed oil, the obtained hydrolyzed oil was subjected to a vacuum distillation under a vacuum condition of 1 Torr to obtain fatty acids (620 g) and glycerides (300 g). The obtained free fatty acids were again subjected to a molecular distillation at 220° C. to isolate polyunsaturated fatty acids (250 g) having 22 or more carbon atoms.

Step (3) Separation of Liquid Oil

In a separate process, the glycerides (300 g) obtained in the step (2) was sufficiently melted at 50° C. Then, while slowing stirring at 15 rpm, the melted glyceride was subjected to a cooling crystallization, which cools the glyceride to −5° C., to remove solid oil (650 g). Thereby, liquid oil (150 g) containing a greater amount of polyunsaturated fatty acids was obtained.

Step (4) Transesterification and Purification

The isolated polyunsaturated fatty acid concentrate (250 g) in the step (2) and the separated liquid oil (80 g) in the step (3) were mixed, and 5.0 g of Novozyme 435 was added thereto. Then, the transesterification was carried out on the mixture under a reduced pressure of 5 Torr, and at a stirring of 250 rpm and temperature of 40° C. for 20 hours. Next, the enzyme was removed by filtration to obtain about 430 g of processed oil. Subsequently, the processed oil was subjected to a molecular distillation to remove the residual free fatty acids, then, discoloration and deodorization were performed thereon to obtain an oil composition according to the present invention.

Analysis of fatty acids and glycerides in the oil composition was carried out by a method disclosed in the analytic examples. The results are presented in Tables 1 to 4.

COMPARATIVE EXAMPLES

Comparative Example 1

The glyceride oil composition derived from a fish oil prepared in the same manner as in Example 1 (100 g), 19.5 g of palmitic acid, and 10.5 g of stearic acid were mixed, then 4.0 g of Lipozyme RM IM (Novozyme) was added thereto. The mixture was subjected to transesterification under a reduced pressure of 5 Torr, and at a stirring of 250 rpm and temperature of 40° C. for 8 hours. Next, the enzyme was removed by filtration to obtain about 127 g of processed oil. Subsequently, the processed oil was subjected to a molecular distillation to remove the residual free fatty acids, then, discoloration and deodorization were performed thereon to obtain 97 g of an oil composition according to the present invention.

Analysis of fatty acids and glycerides in the oil composition was carried out by a method disclosed in the analytic examples. The results are presented in Tables 1 to 4.

Comparative Example 2

The glyceride oil composition derived from a fish oil prepared in the same manner as in Example 2 (100 g), 19.5 g of palmitic acid, and 10.5 g of stearic acid were mixed, then 4.0 g of Lipozyme RM IM (Novozyme) was added thereto. The mixture was subjected to transesterification under a reduced pressure of 5 Torr, and at a stirring of 250 rpm and temperature of 40° C. for 8 hours. Next, the enzyme was removed by filtration to obtain about 127 g of processed oil. Subsequently, the processed oil was subjected to a molecular distillation to remove the residual free fatty acids, then, discoloration and deodorization were performed thereon to obtain 97 g of an oil composition according to the present invention.

Analysis of fatty acids and glycerides in the oil composition was carried out by a method disclosed in the analytic examples. The results are presented in Tables 1 to 4.

Comparative Example 3

A sardine oil (1000 g) was purchased commercially, and deoxidation, discoloration and deodorization were carried out to obtain an oil composition (850 g).

Analysis of fatty acids and glycerides in the oil composition was carried out by a method disclosed in the analytic examples. The results are presented in Tables 1 to 4.

TABLE 1

| Classification | | Ex. 1 | Ex. 2 | Comp. Ex. 1 | Comp. Ex. 2 | Comp. Ex. 3 |
|---|---|---|---|---|---|---|
| Free fatty acid | | 0.1 | 0.1 | 0.1 | 0.2 | 0.1 |
| Glyceride composition | Monoglyceride | 0.2 | 0.2 | 0.1 | 0.2 | 0.1 |
| | 1,3-Diglyceride | 4.8 | 16 | 1.6 | 7 | 0.6 |
| | 1,2-Diglyceride | 2.7 | 8.5 | 0.7 | 3 | 0.2 |
| | Triglyceride | 92.3 | 75.2 | 97.6 | 89.8 | 99.1 |

TABLE 2

Analysis of Constituent Fatty Acids of Total Glycerides

| Constituent fatty acid composition of total glyceride | Ex. 1 | | | Ex. 2 | | | Comp. Ex. 1 | | | Comp. Ex. 2 | | | Comp. Ex. 3 | | |
|---|---|---|---|---|---|---|---|---|---|---|---|---|---|---|---|
| | 1, 3 | 2 | total | 1, 3 | 2 | total | 1, 3 | 2 | total | 1, 3 | 2 | total | 1, 3 | 2 | total |
| Myristic acid C14:0 | 0.4 | 0.3 | 0.4 | 0.7 | 0.5 | 0.6 | 0.3 | 0.3 | 0.3 | 0.6 | 0.5 | 0.5 | 7.4 | 4.5 | 5.95 |
| Palmitic acid C16:0 | 1.7 | 1.9 | 1.8 | 2.0 | 1.6 | 1.8 | 19.5 | 3.5 | 11.5 | 21.7 | 3.1 | 12.4 | 18.2 | 11.3 | 14.8 |

TABLE 2-continued

Analysis of Constituent Fatty Acids of Total Glycerides

| Constituent fatty acid composition of total glyceride | Ex. 1 | | | Ex. 2 | | | Comp. Ex. 1 | | | Comp. Ex. 2 | | | Comp. Ex. 3 | | |
|---|---|---|---|---|---|---|---|---|---|---|---|---|---|---|---|
| | 1, 3 | 2 | total | 1, 3 | 2 | total | 1, 3 | 2 | total | 1, 3 | 2 | total | 1, 3 | 2 | total |
| Palmitoleic acid C16:1 | 0.9 | 0.7 | 0.8 | 1.6 | 1.9 | 1.8 | 0.8 | 0.7 | 0.8 | 1.4 | 2.0 | 1.7 | 8.5 | 12.5 | 10.5 |
| Stearic acid C18:0 | 0.5 | 0.4 | 0.4 | 1.1 | 0.8 | 0.9 | 4.8 | 3.9 | 4.3 | 10.6 | 8.2 | 9.4 | 5.2 | 2.6 | 3.9 |
| Oleic acid C18:1 | 1.8 | 2.3 | 2.0 | 3.2 | 3.9 | 3.6 | 1.9 | 2.4 | 2.2 | 3.4 | 3.1 | 3.3 | 11.1 | 14.9 | 13.0 |
| Linoleic acid C18:2 | 0.5 | 0.7 | 0.6 | 1.3 | 1.5 | 1.4 | 0.5 | 0.6 | 0.5 | 1.4 | 1.4 | 1.4 | 1.0 | 2.2 | 1.6 |
| Eicosanoic acid C20:1 | 1.8 | 2.7 | 2.3 | 2.8 | 3.0 | 2.9 | 1.5 | 2.5 | 2.0 | 2.1 | 2.8 | 2.5 | 2.8 | 3.5 | 0.4 |
| EPA C20:5 | 9.9 | 7.5 | 8.7 | 12.6 | 14.5 | 13.5 | 9.8 | 7.4 | 8.6 | 15.4 | 17.1 | 16.2 | 19.0 | 11.5 | 15.2 |
| DPA C22:5 | 14.4 | 13.8 | 14.1 | 16.5 | 17.8 | 17.2 | 13.7 | 12.9 | 13.3 | 12.9 | 14.3 | 13.6 | 4.8 | 5.9 | 5.4 |
| DHA C22:6 | 67.5 | 68.7 | 68.1 | 57.4 | 53.4 | 55.4 | 46.7 | 64.7 | 55.7 | 30.1 | 46.8 | 38.5 | 14.7 | 30.1 | 22.4 |
| Others | 0.6 | 1.0 | 0.8 | 0.8 | 1.1 | 0.9 | 0.5 | 1.1 | 0.8 | 0.4 | 0.7 | 0.5 | 7.3 | 1.0 | 4.1 |
| DHA/DPA weight ratio | | 4.8 | | | 3.2 | | | 4.2 | | | 2.8 | | | 4.1 | |
| DHA/EPA weight ratio | | 7.8 | | | 4.1 | | | 6.5 | | | 2.4 | | | 1.5 | |

TABLE 3

Analysis of Constituent Fatty Acids of Triglycerides

| Constituent fatty acid composition of triglyceride | Ex. 1 | | | Ex. 2 | | | Comp. Ex. 1 | | | Comp. Ex. 2 | | | Comp. Ex. 3 | | |
|---|---|---|---|---|---|---|---|---|---|---|---|---|---|---|---|
| | 1, 3 | 2 | Total | 1, 3 | 2 | Total | 1, 3 | 2 | Total | 1, 3 | 2 | Total | 1, 3 | 2 | Total |
| Myristic acid C14:0 | 0.42 | 0.28 | 0.35 | 0.73 | 0.48 | 0.60 | 0.40 | 0.20 | 0.30 | 0.62 | 0.58 | 0.60 | 7.94 | 5.68 | 6.50 |
| Palmitic acid C16:0 | 3.45 | 1.28 | 2.31 | 3.68 | 1.01 | 2.3 | 19.86 | 4.17 | 12.0 | 17.65 | 7.86 | 13.0 | 17.76 | 14.00 | 15.20 |
| Palmitoleic acid C16:1 | 0.85 | 0.71 | 0.78 | 2.95 | 1.01 | 1.95 | 0.85 | 0.65 | 0.75 | 1.76 | 1.43 | 1.6 | 11.14 | 8.91 | 9.60 |
| Stearic acid C18:0 | 0.80 | 0.28 | 0.54 | 1.02 | 0.63 | 1.25 | 7.45 | 1.76 | 4.6 | 14.88 | 4.28 | 9.85 | 5.52 | 3.92 | 4.50 |
| Oleic acid C18:1 | 1.17 | 1.32 | 1.25 | 3.68 | 2.77 | 3.21 | 1.56 | 2.45 | 2.0 | 1.90 | 4.44 | 3.1 | 13.24 | 14.10 | 13.20 |
| Linoleic acid C18:2 | 0.48 | 0.46 | 0.47 | 1.56 | 0.97 | 1.25 | 0.41 | 0.59 | 0.5 | 0.62 | 2.06 | 1.3 | 1.65 | 2.06 | 1.80 |
| Eicosanoic acid C20:1 | 2.13 | 2.06 | 2.10 | 3.37 | 3.04 | 3.2 | 1.45 | 2.77 | 2.1 | 1.19 | 2.91 | 2.0 | 0.50 | 0.73 | 0.60 |
| EPA C20:5 | 12.3 | 5.64 | 8.75 | 15.76 | 13.92 | 14.8 | 10.45 | 7.79 | 9.1 | 19.49 | 13.21 | 16.5 | 26.25 | 7.83 | 15.90 |
| DPA C22:5 | 10.80 | 17.50 | 14.40 | 16.97 | 19.81 | 18.0 | 9.5 | 15.50 | 12.5 | 8.08 | 16.59 | 12.1 | 2.54 | 8.71 | 5.60 |
| DHA C22:6 | 67.36 | 70.35 | 68.95 | 50.19 | 56.24 | 53.4 | 48.0 | 64.0 | 55.85 | 33.71 | 46.54 | 39.85 | 13.26 | 34.00 | 23.50 |
| Others | 0.24 | 0.12 | 0.1 | 0.1 | 0.1 | 0.1 | 0.1 | 0.1 | 0.3 | 0.1 | 0.1 | 0.1 | 0.2 | 0.1 | 3.60 |
| DHA/DPA weight ratio | | 4.8 | | | 3.0 | | | 4.5 | | | 3.3 | | | 4.2 | |
| DHA/EPA weight ratio | | 7.9 | | | 3.6 | | | 6.1 | | | 2.4 | | | 1.5 | |

TABLE 4

Analysis of Constituent Fatty Acids of Diglycerides

| Constituent fatty acid composition of diglyceride | Ex. 1 | | | Ex. 2 | | | Comp. Ex. 1 | | | Comp. Ex. 2 | | | Comp. Ex. 3 | | |
|---|---|---|---|---|---|---|---|---|---|---|---|---|---|---|---|
| | 1, 3 | 2 | Total | 1, 3 | 2 | Total | 1, 3 | 2 | Total | 1, 3 | 2 | Total | 1, 3 | 2 | Total |
| Myristic acid C14:0 | 0.53 | 0.28 | 0.40 | 0.59 | 0.09 | 0.34 | 0.50 | 0.10 | 0.30 | 0.57 | 0.36 | 0.45 | 5.37 | 7.00 | 5.88 |
| Palmitic acid C16:0 | 1.98 | 0.89 | 1.40 | 0.59 | 1.21 | 0.90 | 14.01 | 3.20 | 8.56 | 9.06 | 16.44 | 13.21 | 18.85 | 10.50 | 14.68 |
| Palmitoleic acid C16:1 | 0.85 | 0.56 | 0.70 | 0.89 | 0.87 | 0.88 | 0.86 | 0.65 | 0.75 | 2.27 | 1.12 | 1.62 | 10.91 | 10.08 | 10.19 |
| Stearic acid C18:0 | 0.43 | 0.19 | 0.30 | 0.48 | 0.95 | 0.72 | 4.61 | 2.32 | 3.45 | 6.46 | 12.56 | 9.8 | 5.19 | 2.42 | 3.84 |
| Oleic acid C18:1 | 1.07 | 2.35 | 1.75 | 2.44 | 2.65 | 2.55 | 1.58 | 3.43 | 2.50 | 3.61 | 2.89 | 3.20 | 11.76 | 14.34 | 12.46 |
| Linoleic acid C18:2 | 0.43 | 0.75 | 0.60 | 1.37 | 1.16 | 1.27 | 0.97 | 1.54 | 1.25 | 1.07 | 1.36 | 1.23 | 1.12 | 2.56 | 1.69 |
| Eicosanoic acid C20:1 | 2.14 | 3.48 | 2.85 | 2.38 | 2.69 | 2.54 | 2.01 | 3.54 | 2.77 | 2.80 | 3.07 | 2.95 | 0.31 | 0.54 | 0.40 |
| EPA C20:5 | 12.02 | 5.69 | 8.65 | 12.67 | 6.03 | 9.35 | 8.23 | 4.31 | 6.24 | 20.86 | 14.35 | 17.18 | 24.31 | 7.23 | 16.25 |
| DPA C22:5 | 11.28 | 17.24 | 14.45 | 15.9 | 21.00 | 18.45 | 10.63 | 21.29 | 15.91 | 14.09 | 14.32 | 14.21 | 4.98 | 6.89 | 5.62 |
| DHA C22:6 | 68.28 | 68.17 | 68.70 | 62.42 | 63.28 | 62.85 | 56.49 | 59.41 | 57.68 | 39.02 | 33.42 | 35.89 | 17.10 | 38.35 | 25.43 |
| Others | 1.00 | 0.40 | 0.20 | 0.20 | 0.10 | 0.10 | 0.10 | 0.20 | 0.20 | 0.20 | 0.10 | 0.10 | 0.10 | 0.10 | 0.20 |
| DHA/DPA weight ratio | | 4.8 | | | 3.4 | | | 3.6 | | | 2.5 | | | 4.5 | |
| DHA/EPA weight ratio | | 8.0 | | | 6.7 | | | 9.2 | | | 2.1 | | | 1.6 | |

Experimental Examples

Taste of Glyceride Oil Composition derived from Fish Oil

Using the glyceride oil compositions derived from a fish prepared in Examples 1 and 2, and Comparative Examples 1 to 3, taste and color value were evaluated after exposing to specified conditions.

The evaluation was carried out on 100 g of each oil composition in the condition that no antioxidant was added thereto.

Rancimat (Rancimat 743; manufactured by Metrohm Ltd., Switzerland), which is a piece of automated measurement equipment, was used. Each sample was exposed to the conditions in that the temperature was 80° C., the gas flow rate was 20l/hr for 1 hour. The results are presented in Table 5.

TABLE 5

| Classification | Color value (10R + Y) | Taste |
|---|---|---|
| Example 1 | 35 | ○ |
| Example 2 | 32 | ⊚ |
| Comparative Example 1 | 40 | ○ |
| Comparative Example 2 | 39 | Δ |
| Comparative Example 3 | 45 | X |

Taste Symbols

⊚: No unpleasant flavor and very excellent taste

○: Nearly no unpleasant flavor and excellent taste

Δ: Slightly unpleasant flavor and taste x: Unpleasant flavor and very bad taste

As seen from Table 5, with respect to a degree of change in the color value and the taste, the samples of Examples 1 and 2 containing a great amount of polyunsaturated fatty acid and a low amount of saturated fatty acids at 1- and 3-positions exhibited better results than the samples of Comparative Examples 1 to 3 containing a great amount of saturated fatty acids at 1- and 3-positions. Especially, the coloration being inhibited can expect an excellent process characteristic when applied to a variety of application fields.

Amounts of an unsaponifiable substance and a soap in glyceride oil composition were compared, and at the same time a weight change was measured.

The measurement was carried out on a change of a digestion and absorption rate and a growth rate of a rat by supplying fodders having the composition as shown in Table 6 for 2 weeks. The results are presented in Table 7.

TABLE 6

| Fodder components | Composition ratio (wt %) |
|---|---|
| Glyceride oil composition derived from fish oil | 50 |
| Casein | 10 |
| Mineral mixture | 3.5 |
| Vitamin mixture | 1.0 |
| D,L-methionine | 0.3 |
| Potato starch | 30.2 |
| Cellulose | 5.0 |
| Total | 100 |

TABLE 7

| Classification (Dry wt %) | Ex. 1 | Ex. 2 | Comp. Ex. 1 | Comp. Ex. 2 | Comp. Ex. 3 |
|---|---|---|---|---|---|
| Amount of unsaponifiable substance | 4.52 ± 0.99 | 3.98 ± 1.20 | 6.94 ± 2.08 | 6.21 ± 1.87 | 5.85 ± 2.17 |
| Amount of soap | 12.61 ± 1.56 | 10.84 ± 1.23 | 31.10 ± 2.13 | 28.64 ± 1.89 | 23.54 ± 2.34 |
| Total C22:5 | 0.60 ± 0.03 | 0.67 ± 0.01 | 1.45 ± 0.04 | 1.41 ± 0.03 | 1.14 ± 0.01 |
| Total C22:6 | 2.05 ± 0.02 | 1.98 ± 0.04 | 4.21 ± 0.02 | 3.98 ± 0.05 | 3.51 ± 0.02 |
| Weight Change (g) | 65.4 ± 2.5 | 68.7 ± 3.1 | 53.4 ± 1.9 | 56.0 ± 2.6 | 58.9 ± 1.1 |

As seen from Table 7, the amount of soap in the feces of the experiment group which orally ingested fodders using Examples 1 and 2 was reduced by about 30% compared with Comparative Examples 1 and 2. When compared with Comparative Example 3 containing a purified fish oil, the amount of soap is reduced by about half. Moreover, such a tendency was the same for the amount of unsaponifiable substance and the excretion amount of, namely, DHA and DPA among the total fatty acids. Such a result had a close relation with the content of the saturated fatty acids at 1- and 3-positions of the oil, namely, palmitic acid and stearic acid. That is, palmitic acid and stearic acid were decomposed at the small intestine by enzyme, and then formed soap. As a result, it was confirmed that the absorption of the fatty acids to be used as a source for energy was reduced. Additionally, the absorption of the polyunsaturated fatty acids was also reduced by forming insoluble salts. Therefore, as seen from the weight change, the contents of palmitic acid and stearic acid at 1- and 3-positions make weight lose.

TABLE 8

| Classification | Separated oil layer % |
|---|---|
| Mayonnaise containing Example 1 | 28 |
| Mayonnaise containing Example 2 | 30 |
| Mayonnaise containing Comparative Example 1 | 38 |
| Mayonnaise containing Comparative Example 2 | 35 |
| Mayonnaise containing Comparative Example 3 | 39 |
| Control | 31 |

Analytic Examples

1. Gas Chromatography for Analyzing Fatty Acid Composition

The fatty acid composition was analyzed by injecting a sample with a concentration of 25 g/l, under the conditions in that the column was HP-INNOWAX (manufactured by Agilent Technologies, Inc., USA), the carrier gas was helium (2.1 ml/min), the oven temperature was 150 to 260° C., and the flame ionization detector (FID) was set at 275° C.

2. Liquid Chromatography for Analyzing Glyceride Composition

The glyceride composition was analyzed under the conditions in that the column was Supercosil Lc-Si (5 □ and 25 cm; manufactured by Supelco, Inc.), eluents were solvent A (benzene 70:chloroform 30: acetic acid 2) and solvent B (ethyl acetate), a sample injection concentration was 1 mg/ml (chloroform solvent), using evaporative light scattering detector (ELSD) with a flow rate of 2.3 ml/min.

3. Liquid Chromatography for Analyzing Positional Isomers of Glyceride

The positional isomers of glyceride was analyzed under the conditions in that the column was ChromSper Lipids (5 □ and 25 cm; manufactured by Varian, Inc.), eluent was n-hexane containing 0.5% acetonitrile, a sample injection concentration was 1 mg/ml (chloroform solvent), and using evaporative light scattering detector (ELSD) with a flow rate of 2.3 ml/min.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A glyceride oil composition derived from a fish oil comprising: docosahexaenoic acid (DHA) and docosapentaenoic acid (DPA) with a content of 45 to 95% by weight and eicosapentaenoic acid (EPA) with a content of 0.001 to 13% by weight among constituent fatty acids; and a saturated fatty acid having 16 to 18 carbon atoms, which is bonded at 1- and 3-positions, with a content of 0.001 to 5% by weight among constituent fatty acids, wherein a weight ratio of docosahexaenoic acid (DHA)/docosapentaenoic acid (DPA) is 0.5 to 8 and a weight ratio of docosahexaenoic acid (DHA)/eicosapentaenoic acid (EPA) is 3.5 to 15.

2. The composition according to claim 1, wherein the saturated fatty acid is palmitic acid (C16:0) or stearic acid (C18:0).

3. A food product comprising the glyceride oil composition derived from a fish oil according to claim 2.

4. The composition according to claim 1, wherein the glyceride comprises 20 to 98% by weight of triglyceride and 2 to 80% by weight of diglyceride.

5. The composition according to claim 4, wherein the glyceride comprises
   (i) 20 to 98% by weight of triglyceride containing docosahexaenoic acid (DHA) and docosapentaenoic acid (DPA) with a content of 45 to 95% by weight and eicosapentaenoic acid (EPA) with a content of 0.001 to 13% by weight among constituent fatty acids, and stearic acid and palmitic acid bonded at 1- and 3-positions with a content of 0.001 to 5% by weight among the constituent fatty acids, wherein a weight ratio of docosahexaenoic acid (DHA)/docosapentaenoic acid (DPA) is 0.5 to 8 and a weight ratio of docosahexaenoic acid (DHA)/eicosapentaenoic acid (EPA) is 3.5 to 15; and
   (ii) 2 to 80% by weight of diglyceride containing docosahexaenoic acid (DHA) and docosapentaenoic acid (DPA) with a content of 55 to 95% by weight and eicosapentaenoic acid (EPA) with a content of 0.001 to 10% by weight among constituent fatty acids, and stearic acid and palmitic acid bonded at 1- and 3-positions with a content of 0.001 to 3% by weight among the constituent fatty acids, wherein a weight ratio of docosahexaenoic acid (DHA)/docosapentaenoic acid (DPA) is 0.5 to 8, a weight ratio of docosahexaenoic acid (DHA)/eicosapentaenoic acid (EPA) is 3.5 to 15, and a weight ratio of 1,3-diglyceride/1,2-diglyceride is 0.4 to 4.5.

6. A food product comprising the glyceride oil composition derived from a fish oil according to claim 4.

7. The composition according to claim 1, further comprising 0.001 to 5% by weight of an antioxidant.

8. A food product comprising the glyceride oil composition derived from a fish oil according to claim 7.

9. The composition according to claim 5, wherein the antioxidant is selected from the group consisting of butylhydrozyanisole (BHA), butylated hydroxyl toluene (BHT), tert-butylhydroquinone (TBHQ), a natural antioxidant, catechin, Vitamin C, and Vitamin E.

10. A food product comprising the glyceride oil composition derived from a fish oil according to claim 1.

11. The food product according to claim 10, wherein the food product is a cooking oil, a salad oil, an oil for frying, margarine, fat spread, shortening, ice cream, a fresh cream substitute, dressing, mayonnaise, an edible oil for baking, or an infant food.

12. A method for preparing a glyceride oil composition derived from a fish oil comprising: subjecting a purified fish oil to specific hydrolysis at 1- and 3-positions using a 1,3-position specific immobilized enzyme; separating the hydrolyzed products into fatty acids and glycerides, and subjecting the separated fatty acids to molecular distillation to isolate polyunsaturated fatty acids; subjecting the separated glycerides to cooling crystallization to separate a liquid oil; mixing the isolated polyunsaturated fatty acids and the separated liquid oil with a weight ratio of 5.0 to 80.0:20.0 to 95.0, and subjecting the mixture to transesterification using a 1,3-position specific immobilized enzyme at a temperature of 25 to 80° C. and a stirring of 10 to 400 rpm, and under a reduced pressure of 0.001 to 10 Torr for 1 to 48 hours; and removing the unreacted residual substances by carrying out a distillation and typical purification process.

13. The method according to claim 12, wherein the liquid oil separation step is carried out with a cooling rate of 5 to 10° C./hr and a stirring rate of 100 to 300 rpm.

14. The method according to claim 12, wherein the 1,3-position specific immobilized enzyme is an enzyme derived from microorganisms including *Rhizopus* sp., *Aspergillus* sp. or *Mucor* sp.

15. The method according to claim 12, wherein the immobilized enzyme is used in an amount of 0.1 to 20 parts by weight based on 100 parts by weight the reactive substance in the enzymatic reaction.

16. A method for preparing a glyceride oil composition derived from a fish oil comprising: subjecting a purified fish oil to non-specific hydrolysis using a non-specific immobilized enzyme; separating the hydrolyzed products into fatty acids and glycerides, and subjecting the separated fatty acids to molecular distillation to isolate polyunsaturated fatty acids; subjecting the fish oil to cooling crystallization to separate a liquid oil; mixing the isolated polyunsaturated fatty acids and the separated liquid oil with a weight ratio of 30.0 to 80.0:20.0 to 70.0, and subjecting the mixture to transesterification using a 1,3-position specific immobilized enzyme at a temperature of 25 to 80° C. and a stirring of 10 to 400 rpm and under a normal pressure for 1 to 48 hours; and removing the unreacted residual substances by carrying out a distillation and typical purification process.

17. The method according to claim 16, wherein the non-specific immobilized enzyme is *Candida cylindracea* or the pancreas enzyme.

18. The method according to claim 16, wherein the liquid oil separation step is carried out with a cooling rate of 5 to 10° C./hr and a stirring rate of 100 to 300 rpm.

19. The method according to claim 16, wherein the 1,3-position specific immobilized enzyme is an enzyme derived from microorganisms including *Rhizopus* sp., *Aspergillus* sp. or *Mucor* sp.

20. The method according to claim 16, wherein the immobilized enzyme is used in an amount of 0.1 to 20 parts by weight based on 100 parts by weight the reactive substance in the enzymatic reaction.

\* \* \* \* \*